(12) United States Patent
Birchbauer et al.

(10) Patent No.: US 11,989,870 B2
(45) Date of Patent: May 21, 2024

(54) METHOD AND ASSEMBLY FOR DETECTING OBJECTS ON SYSTEMS

(71) Applicant: Siemens Energy Global GmbH & Co. KG, Bayern (DE)

(72) Inventors: Josef Alois Birchbauer, Seiersberg (AT); Vlad Comanelea-Serban, Brasov (RO); Olaf Kähler, Graz (AT)

(73) Assignee: Siemens Energy Global GmbH & Co. KG, Bayern (DE)

( * ) Notice: Subject to any disclaimer, the term of this patent is extended or adjusted under 35 U.S.C. 154(b) by 513 days.

(21) Appl. No.: 17/268,458

(22) PCT Filed: Aug. 20, 2019

(86) PCT No.: PCT/EP2019/072269
§ 371 (c)(1),
(2) Date: Feb. 13, 2021

(87) PCT Pub. No.: WO2020/038944
PCT Pub. Date: Feb. 27, 2020

(65) Prior Publication Data
US 2021/0174061 A1 Jun. 10, 2021

(30) Foreign Application Priority Data
Aug. 21, 2018 (EP) .................... 18190055

(51) Int. Cl.
*G06T 17/00* (2006.01)
*G01S 17/89* (2020.01)
(Continued)

(52) U.S. Cl.
CPC ............ *G06T 7/0004* (2013.01); *G01S 17/89* (2013.01); *G06T 17/00* (2013.01); *G06V 20/17* (2022.01); *G06V 20/176* (2022.01); *G06V 20/64* (2022.01)

(58) Field of Classification Search
CPC .................. G06T 7/0004; G06T 17/00; G06T 2207/10012; G06T 2207/10028;
(Continued)

(56) References Cited

U.S. PATENT DOCUMENTS

| 11,054,258 B2 | 7/2021 | Siercks |
| 2002/0014533 A1 | 2/2002 | Zhu |

(Continued)

FOREIGN PATENT DOCUMENTS

| CN | 102930246 A | 2/2013 |
| CN | 103988226 A | 8/2014 |

(Continued)

OTHER PUBLICATIONS

Mason, Michael, Zoran Duric, "Using Histograms to Detect and Track Objects in Color Video" 2001 IEEE; 2001.
(Continued)

*Primary Examiner* — Siamak Harandi
(74) *Attorney, Agent, or Firm* — Wolter Van Dyke Davis, PLLC

(57) ABSTRACT

A method for detecting objects on systems, includes providing a three-dimensional representation of the system, wherein the position and orientation of the representation and the system are known, and capturing a first image and a second image of the system, the two images being captured from different positions above the system. For a plurality of sections of the system, a respective comparison of the first and the second image is carried out using a parallax effect. If the images in a region surrounding the system match, an object is detected on the system.

13 Claims, 3 Drawing Sheets

(51) Int. Cl.
*G06T 7/00* (2017.01)
*G06V 20/10* (2022.01)
*G06V 20/17* (2022.01)
*G06V 20/64* (2022.01)

(58) Field of Classification Search
CPC . G06T 2207/10032; G06T 2207/20012; G06T 2207/30184; G01S 17/89; G06V 20/17; G06V 20/176; G06V 20/64; H02G 1/02
See application file for complete search history.

(56) References Cited

U.S. PATENT DOCUMENTS

| | | | |
|---|---|---|---|
| 2014/0293016 | A1 | 10/2014 | Benhimane |
| 2015/0193963 | A1* | 7/2015 | Chen ................ G06T 17/05 345/426 |
| 2017/0098298 | A1 | 4/2017 | Nishijima |
| 2018/0003656 | A1* | 1/2018 | Michini ............. H02S 50/10 |
| 2018/0137339 | A1 | 5/2018 | Osato |
| 2018/0300898 | A1 | 10/2018 | Eshima |
| 2019/0266745 | A1 | 8/2019 | Gomezcaballero |

FOREIGN PATENT DOCUMENTS

| | | |
|---|---|---|
| CN | 106461391 A | 2/2017 |
| CN | 106560837 A | 4/2017 |
| CN | 107533749 A | 1/2018 |
| CN | 107729878 A | 2/2018 |
| CN | 108139202 A | 6/2018 |
| CN | 108229548 A | 6/2018 |
| CN | 108364304 A | 8/2018 |
| JP | 2014089548 A | 5/2014 |
| JP | 2018101200 A | 6/2018 |

OTHER PUBLICATIONS

Ren, Shaoqing, et al. "Faster R-CNN: Towards real-time object detection with region proposal networks." Advances in neural information processing systems; 2015.
Parallaxe aus Wikipedia, der freien Enzyklopädie, retrieved from https://de.wikipedia.org/wiki/Parallaxe, "Parallax—Wikipedia" English machine translation attached.
He, Kaiming; Gkioxari Georgia et al., "Mask R-CNN" Facebook AI Research (FAIR).
Usamentiaga, Ruben; Pablo Venegas, Jon Guerediaga, et al., "Infrared Thermography for Temperature Measurement and Non-Destructive Testing" Jul. 10, 2014; 2014.
Li, Qingwu, et al: "Bionic Vision-Based Intelligent Power Line Inspection System", Computational and Mathematical Methods in Medicine, vol. 2017, pp. 1-13, XP055560128, ISSN: 1748-670X, DOI: 10.1155/2017/4964287; the whole document; 2017.
Elektromagnetisches Spektrum aus Wikipedia, der freien Enzyklopädie, retrieved from https://de.wikipedia.org/wiki/Elektromagnetisches_Spektrum, "Electromagnetic Spectrum—Wikipedia" English machine translation attached.
Vetrivel, A. et al: "Segmentation of UAV-based images incorporating 3D point cloud information", ISPRS—International Archives of the Photogrammetry, Remote Sensing and Spatial Information Sciences, vol. XL-3/W2, pp. 261-268, XP055560387, DOI: 10.5194/isprsarchives-XL-3-W2-261-2015; the whole document; 2015.
Southey, Tristram, "Improving Object Detection using 3D Spatial Relationships" The University Of British Columbia, Aug. 2013; 2013.
Liu, Wei; Dragomir Anguelov; et al., "SSD: Single Shot MultiBox Detector" UNC Chapel Hill; Zoox Inc. ; Google Inc.; University of Michigan; Ann-Arbor.
Chandola, et al., "Anomaly Detection: A Survey"; ACM Computing Surveys, Sep. 2009, pp. 1-72.
Denzler, J.; M. Zobel, J. Triesch, "Probabilistic Integration of Cues From Multiple Cameras" University of California, San Diego, Cognitive Science Department.
Zhang, Changsai et al: "Key technologies of laser point cloud data processing in power line corridor", Proceedings of SPIE; [Proceedings of SPIE ISSN 0277-786X vol. 10524], SPIE, US, vol. 10605, pp. 106050M-106050M, XP060098571, DOI: 10.1117/12.2295174; ISBN: 978-1-5106-1533-5, the whole document; 2017.
Melzer, Thomas & Briese, Christian. (2004). Extraction and Modeling of Power Lines from ALS Point Clouds, Vienna University of Technology; Retrieved from Internet: URL:https://publik.tuwien.ac.at/files/PubDat_119606.pdf; [retrieved on Feb. 21, 2019], the whole document; 2018.
Jwa, Yooseok et al., "A Piecewise Catenary Curve Model Growing for 3D Power Line Reconstruction", Photogrammetric Engineering & Remote Sensing, pp. 1227-1240, XP055560796, DOI: 10.14358/PERS.78.11.1227; Retrieved from Internet: URL:https://www.ingentaconnect.com/content/asprs/pers/2012/00000078/00000012/art00001?crawler=true; [retrieved on Feb. 22, 2019], the whole document; 2012.
PCT International Search Report and Written Opinion of International Searching Authority dated Feb. 12, 2019 corresponding to PCT International Application No. PCT/EP2019/072269 filed Aug. 20, 2019.
Wang Ruisheng et al: "LiDAR Point Clouds to 3-D Urban Models : A Review", IEEE Journal of Selected Topics in Applied Earth Observations and Remote Sensing, Jan. 2018, pp. 606-627, XP055560359, DOI: 10.1109/JSTARS.2017.2781132.
Wang, C., & Li, Z., Weed recognition using SVM model with fusion height and monocular image features, Transactions of the Chinese Society of Agricultural Engineering, 2016, pp. 165-174, 32(15) [English abstract on pp. 9-10].
Kang, J., Cohen, I., Medioni, G., & Yuan, C., Detection and tracking of moving objects from a moving platform in presence of strong parallax. In Tenth IEEE International Conference on Computer Vision (ICCV'05), Oct. 2005, pp. 10-17, vol. 1, IEEE.

\* cited by examiner

METHOD AND ASSEMBLY FOR DETECTING OBJECTS ON SYSTEMS

CROSS REFERENCE TO RELATED APPLICATIONS

This application is the US National Stage of International Application No. PCT/EP2019/072269 filed 20 Aug. 2019, and claims the benefit thereof. The International Application claims the benefit of European Application No. EP18190055 filed 21 Aug. 2018. All of the applications are incorporated by reference herein in their entirety.

FIELD OF INVENTION

The invention relates to a method and an arrangement for detecting objects on installations.

BACKGROUND OF INVENTION

The previously unpublished European patent application 17161027.2 dated 15 Mar. 2017, entitled "Method and assembly for monitoring the state of a system with operating elements", discloses a method for monitoring the state of a system or installation with operating elements, in which overview data are recorded by means of a first vehicle using an overview sensor arrangement for optically detecting the installation, and using an evaluation device the operating elements are detected in the overview data and the positions of the operating elements are identified taking into account the position of the first vehicle, wherein detailed photographs of the operating elements are generated by means of a second vehicle having a detail camera which is oriented to the respective positions of the operating elements. For example, only a single aircraft, such as a drone or a helicopter, is used to detect masts and insulators by means of the overview camera during a flight over an overhead line, to determine the position of the insulators and then to obtain high-resolution images of the insulators using the detail camera. This means that damaged insulators can be detected easily and safely.

Numerous methods of detection in images are already known from the prior art. Object detection in two-dimensional (2D) images in particular has recently received increasing attention. But classical detection techniques, e.g. in thermographic images or UV images, can also be found in constant industrial use. Numerous other 2D detection methods also exist, e.g. based on anomalies or also color differences. While most of the work to date is limited to 2D detection techniques, there are a few studies that attempt to transfer detection methods to a three-dimensional (3D) space.

For example, a known publication is "Probabilistic Integration of Cues From Multiple cameras" by J. Denzlerl et al., which deals with the integration of recorded images from different cameras. The publications "Faster R-CNN: Towards Real-Time Object Detection with Region Proposal Networks" by Shaoqing Ren et al., "SSD: Single Shot MultiBox Detector" by Wei Liu et al. and "Using Histograms to Detect and Track Objects in Color Video" by Michael Mason et al., 2001, all disclose methods for object recognition in image data. The publication "Anomaly Detection: A Survey" by Varun Chandola et al., ACM Computing Surveys, 2009, deals with the detection of deviations from expected patterns in data.

In addition, the doctoral thesis "Improving Object Detection using 3D Spatial Relationships" by Tristram Southey, MSc., University of British Columbia, 2013, is known. A three-dimensional image analysis is described.

During the inspection of installations such as overhead lines, overflights with helicopters and image recordings are currently used to detect damage sites or objects on the overhead line. The decision as to whether an object such as a bird's nest, a balloon or a kite (children's toy) is resting on the conductor cables or on the ground below is difficult to make and susceptible to error solely based on aerial photographs. Up to now, this has usually been carried out by manually evaluating the recorded images. If objects on the line are detected incorrectly, then wasted costs and effort are incurred by the maintenance work that is initiated.

Detection in one or more recorded images cannot always be uniquely assigned to a specific 3D object. Since the individual 2D images do not contain depth information, the distance to an object along the visual line cannot be determined. Thus, detections cannot be restricted to the relevant areas of the 3D space, which sometimes leads to irrelevant false positives. For example, if objects on an overhead line are to be distinguished from objects underneath the overhead line, this is not a trivial task using automated image evaluation on aerial photographs (bird's eye view).

SUMMARY OF INVENTION

An object of the invention is to specify a method with which objects on installations can be automatically and reliably detected.

The invention achieves this object by means of a method according to the independent claim.

According to the invention, the object recognition problem is solved by using the 3D information associated with the respective 2D points. Due to the parallax effect, objects under the installation, e.g. an overhead line, are represented in the images at different positions in relation to the line. A parallax effect occurs when an observer shifts their own position and so causes an apparent change in the position of an object. For example, the effect of parallax is described in detail on Wikipedia (permanent link: https://de.wikipedia.org/w/index.php?title=Parallaxe&oldid=178305744).

For example, an installation can be an electrical installation such as an overhead line or an aerial line. It can also be a pipeline, however. An object can be a bird's nest, a car, or a kite, for example.

The object of the invention is to provide 3D information in conjunction with 2D detection in the 3D space in order to reduce the false alarm rate compared to simple 2D detection methods.

An advantage of the invention is that the frequency of false positive detections of objects on an installation, i.e. an alarm rate, is reduced by the combined use of multiple views in a comparatively computationally and memory-efficient method. This results in a comparatively more reliable automatic detection of objects from aerial images and a significant reduction in the effort required for manual post-processing. Even false positives which only appear in a single image of a camera can be reliably detected with the method.

According to the invention, it is possible to distinguish reliably, quickly and automatically between objects on an installation—that is, elevated above the ground—and objects underneath the installation—that is, near to the ground. This is an advantage because hazards or damage to an installation such as an overhead line must be immediately remedied by maintenance technicians. If an object such as a bird's nest or a kite is incorrectly identified as being located on the transmission line, a shutdown of the line and/or maintenance is triggered unnecessarily, which incurs costs and reduces the availability of the installation.

Furthermore, an advantage of the invention is that the method described has comparatively low computational complexity. Since it is only necessary to read out scalar values in the two two-dimensional images at the known 3D points—the sections of the installation—the memory and/or computing requirements are comparatively much smaller than in alternative methods.

In an embodiment of the method according to the invention, the three-dimensional representation of the installation provided is used to restrict a search space for the installation or to assign the detected object to a component of the installation in the three-dimensional representation. It has surprisingly been found that the use of the already existing three-dimensional representation makes it possible, in particular, to reduce the required computing power for the image evaluation by restricting the search space. In addition, a detected object can be assigned to a component contained in the three-dimensional representation, which enables relevant and irrelevant objects to be separated easily and reliably for further evaluation. Both approaches allow the computing power required to be significantly reduced. Both options have proved to be very advantageous. The first option, for example, allows an undesirable false-negative rate, which might be expected in the case in question, to be reduced at the expense of a slightly higher level of computing power. The second option allows, for example, potential problem sites to be identified during the image acquisition by means of a less computationally intensive pre-classification and, if necessary, a more precise inspection of these objects to be performed automatically. A combination of these two options has also proved advantageous.

In a further embodiment of the method according to the invention, the three-dimensional representation is acquired as a three-dimensional point cloud (PCD), wherein the three-dimensional point cloud (PCD) is semantically segmented in order to restrict a search space for the installation in the three-dimensional point cloud (PCD). Restricting the search space in this way has proved to be particularly beneficial for typical use cases, such as those that occur during the inspection of overhead lines.

In another embodiment of the method according to the invention, the three-dimensional representation is obtained by means of a "light detection and ranging (LIDAR)" sensor and acquired as a three-dimensional point cloud (PCD). This is an advantage because LIDAR can be used to obtain highly accurate information about the position of objects. In conjunction with the position of the aircraft, the positions of the objects in the three-dimensional space can be determined.

In a further embodiment of the method according to the invention, the three-dimensional point cloud (PCD) is semantically segmented in order to restrict a search space for the installation in the three-dimensional point cloud (PCD). This is an advantage because the object detection is limited to the relevant region, which significantly reduces the computing requirements and/or increases the speed of the calculations. The complexity is reduced because the search space is restricted to relevant scene contents. If the evaluation is carried out on board the aircraft, in this embodiment weight can be saved, because a less powerful computer system is required. A typical example is LIDAR data of a high-voltage transmission line, in which the points belonging to the overhead lines are (automatically) determined, or approximated by means of the parametric model of a catenary curve. An example of a method for segmenting image data is known from the publication "Mask R-CNN" by Kaiming He et al.

A classical 2D detector, which is pre-trained to detect certain fault classes, for example, is applied to this restricted search space. Alternatively, in the sense of an anomaly detection, a model of the standard conductor region is automatically determined (e.g. by means of auto-encoders) and outliers are detected. The result of both approaches is to determine a probability of potential detection-relevant states of individual pixels or image regions. In one variant, the image space can be restricted not just to the visible light region, but can also extend to adjacent spectral regions such as (thermal) infrared and ultraviolet light.

In an extension of the above-mentioned embodiment, provision is made to query the detection responses or pixel color values in the individual images for each 3D point of the installation and then to consolidate these individual detection results. One of the following linear or nonlinear mathematical approaches can be used as a consolidation function: extreme value determination (minimum/maximum), median determination, mean value determination, other robust statistics such as those based on quantiles.

The following method steps can be performed: —3D point clouds and high-resolution localized images are obtained as the INPUT; —Optionally, the 3D point cloud is segmented semantically (optionally, since the entire PCD can also be semantically relevant to the inspection task); —The 3D points remaining after segmentation are projected into the 2D images; —At the resulting points in the 2D image, detection results are either selectively generated or the existing detection results are read out (the latter if the detection in the image space has covered the entire area); —For each 3D point, the associated individual detections in the image space are checked for consistency by means of a consolidation function; —Optionally, the remaining 3D points can in turn be projected back into the image space, yielding the final detection result in the image space.

In another embodiment of the method according to the invention, an overhead line is used as the installation and the semantic segmentation is carried out by using a model of a catenary curve for detecting conductor cables of the overhead line. This is an advantage because the search space can be restricted in a simple way.

In a further embodiment of the method according to the invention, the position and orientation of the representation are determined using a position determination system. This can be carried out, for example, by means of a receiver for Global Positioning System (GPS) signals, wherein the orientation depends on the viewing direction of the sensor arrangement (LIDAR or camera). The viewing direction can be determined, for example, by means of a tilt sensor in conjunction with a compass, which are provided in the aircraft.

In another embodiment of the method according the invention, the images are recorded by means of a camera for visible light. The light visible to humans is usually specified as wavelengths between 380 nm to 780 nm (permanent link: https://de.wikipedia.org/w/index.php?title=Elektromagnetisches_Spektrum&oldid=178702023).

In an extension of the above-mentioned embodiment, additional cameras are used to improve the reliability. For example, a plurality of cameras can be used redundantly or with different magnifications or detail resolutions. This is an advantage because it increases the probability of being able to obtain all the necessary image data with just a single overflight of the installation.

In another embodiment of the method according the invention, the camera is guided along the installation with an aircraft in order to record the first and second images at the two different positions.

In a further embodiment of the method according to the invention, the three-dimensional representation of the installation is projected into each of the two images in order to define the sections in each case.

In a further embodiment of the method according to the invention, the evaluation device is provided in the aircraft. This is an advantage because an evaluation and object detection can take place directly during an overflight. The images and coordinates of the detected objects can be stored and transmitted to the operator of the installation at the end of the flight. Alternatively, using data communication via radio the detected objects can even be transferred during the flight.

In a further embodiment of the method according to the invention, the evaluation device is provided as a central server. This is an advantage because weight and installation space are saved in the aircraft. For example, all data collected by the camera and the LIDAR can be temporarily stored on a data memory and transmitted to the evaluation device for evaluation at the end of the flight. Alternatively, using data communication via radio the data can even be transferred to the evaluation unit during the flight.

Another object of the invention is to specify an assembly with which objects on installations can be automatically and reliably identified.

The invention achieves this object with an assembly according to the independent claim. Embodiments are obtained from the dependent claims. This means that for the assembly according to the invention and its embodiments, the same advantages are obtained, mutatis mutandis, as those described above for the method according to the invention.

BRIEF DESCRIPTION OF THE DRAWINGS

For a better explanation of the invention, in the drawings, schematically in each case.

DETAILED DESCRIPTION OF INVENTION

Figure 1:
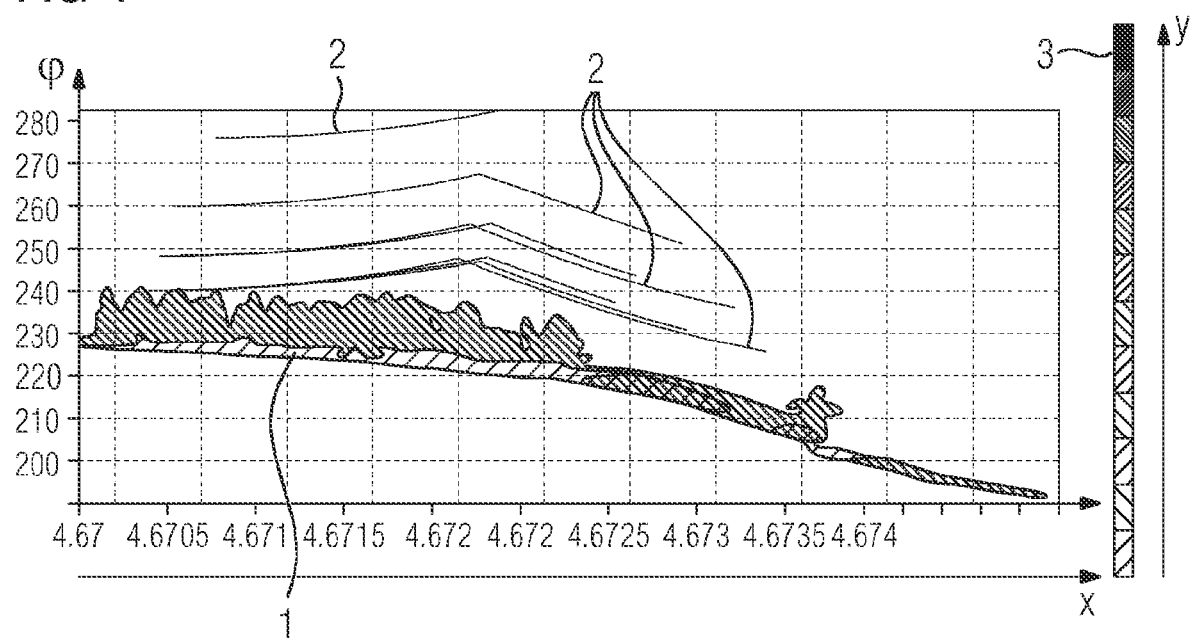
FIG. 1 shows an example of a semantic segmentation of LIDAR image data.

FIG. 1 shows an example of a semantic segmentation of LIDAR image data. The viewing angle $\varphi$ of the LIDAR is plotted against the position coordinate x. A color scale 3 represents the strength of the LIDAR signals received. It can be seen that after successful segmentation of the overhead cable by means of a model of a catenary function, the cable 1 is highlighted. The other cables 2 remain in the background.

Figure 2:
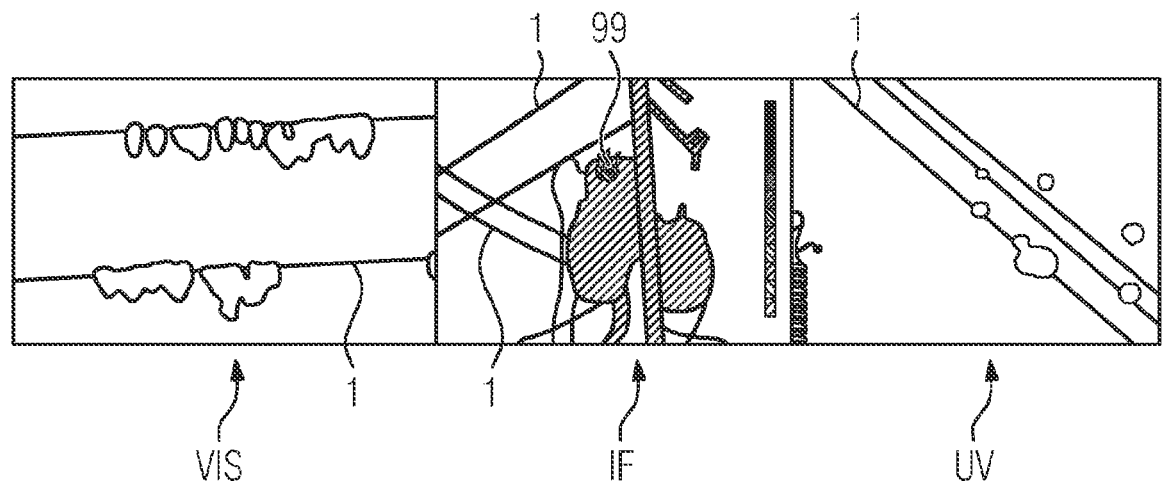
FIG. 2 shows an example of images of an overhead line in different frequency ranges.

FIG. 2 shows an example of images of an overhead line in different frequency ranges. From left to right, an image is shown in the visible frequency range (VIS), in the infrared frequency range (IF) and in the ultraviolet frequency range (UV) respectively. In the visible frequency range (VIS), bird's nests can be seen on the cables 1. In the infrared range (IF), a particularly heated region 99 of an insulator on a mast can be seen. In the UV range (UV), corona discharges can be clearly seen on the cables 1.

Figure 3:
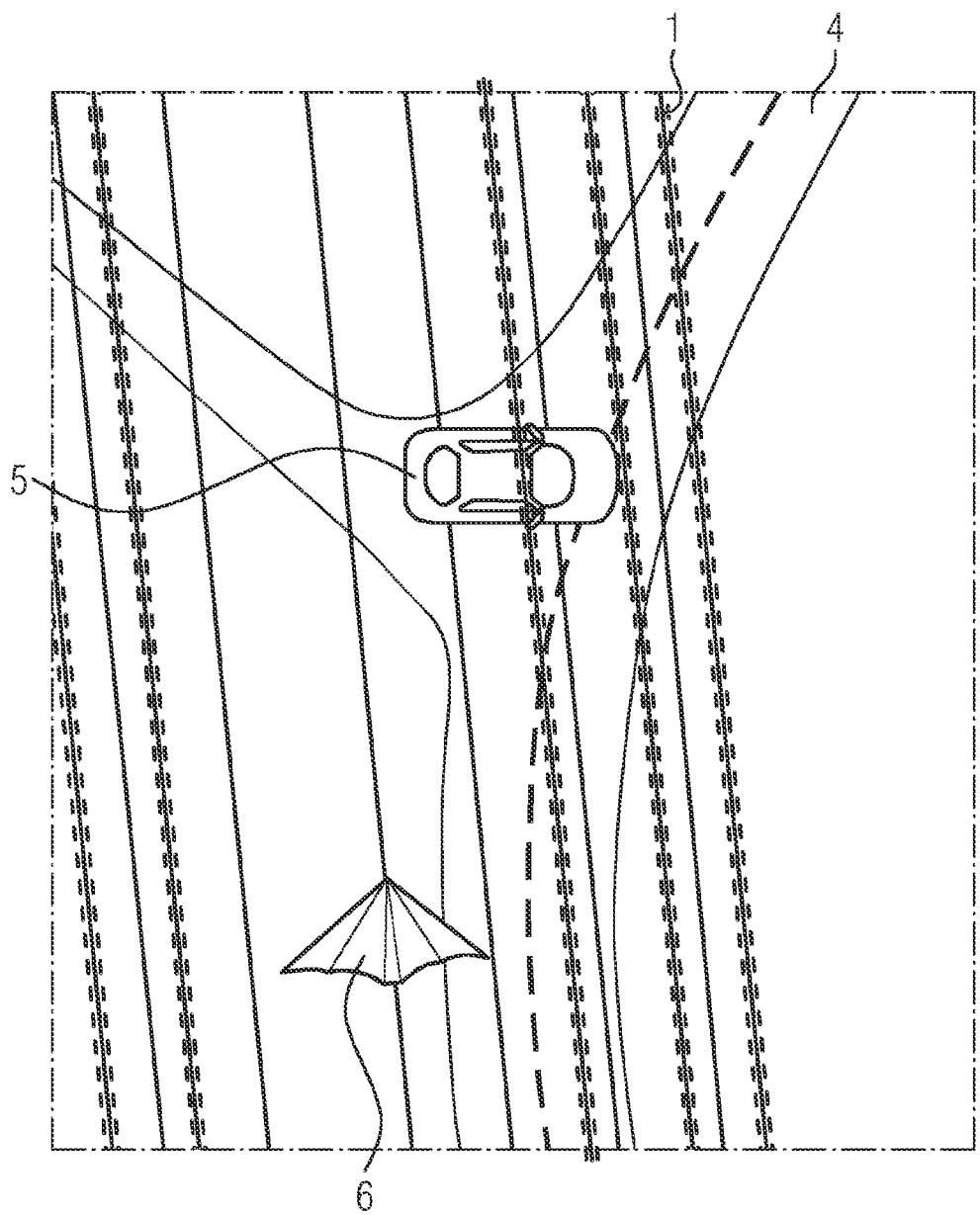
FIG. 3 shows an example of an anomaly detection of objects on an overhead line.

FIG. 3 shows an example of an anomaly detection of artificially inserted objects on an overhead line. The image is recorded from above during an overflight. In this case, conductor cables 1 run over forested areas and a road 4, which forks in the upper part of the picture. A car 5 is parked on the road 4. A kite 6 is arranged on one of the conductor cables. In the image, both objects are correctly identified by the evaluation algorithm as deviating from the expected shape of conductor cables. However, the algorithm cannot readily obtain the depth information, i.e. it cannot decide whether the car, and in particular whether the kite, is located on the cable or below it on the ground.

Figure 4:
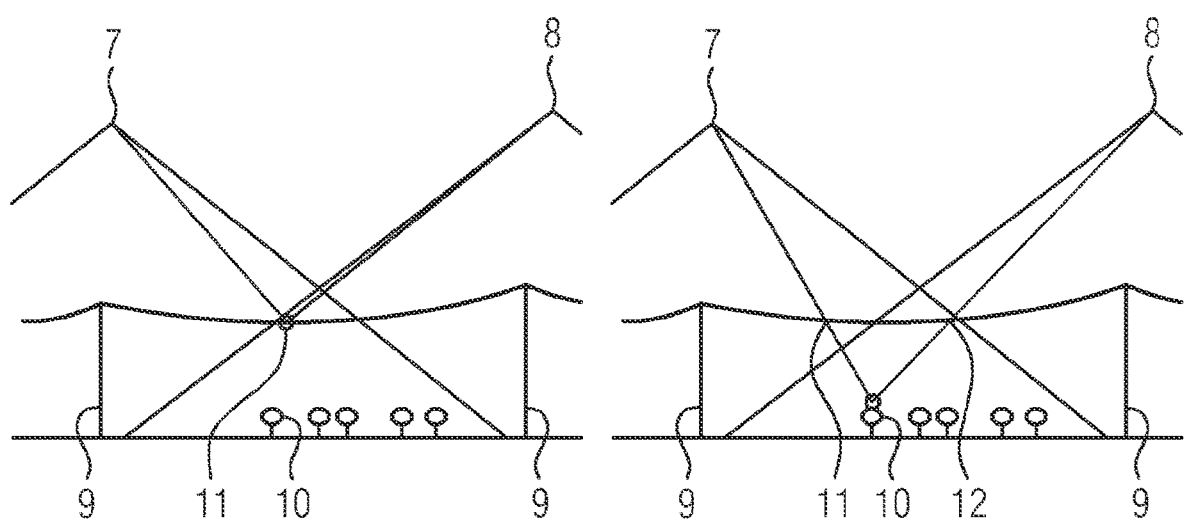
FIG. 4 shows an example of a detection of the position of objects on an overhead line using the parallax effect.

In order to distinguish objects on the ground from objects on the cable, the invention proposes to exploit the parallax effect. FIG. 4 shows two scenes side by side. Two masts 9 each support an overhead line. Trees 10 can be seen below the overhead line. A first and a second image are recorded at two different positions 7,8 during an overflight of the cable.

In the left-hand image, it can be seen that when both viewing directions for the two images are oriented to a point 11 on the overhead line that was previously detected by segmentation in the 3D space, both images target a section 11 of the cable in their visual lines. If an object is arranged directly on the cable, the object appears at the same location on the cable from both perspectives. The situation is different for the tree 10 in the right-hand picture. The tree 10 does not appear in the same place on the cable in the two pictures, but due to the parallax effect, from viewing direction 7 it appears at section 11 and from viewing direction 8 at section 12 of the cable. This means that the tree 10 must be arranged not at the same height as the cable, but in fact below it. This principle allows a simple automated distinction between objects arranged on or above an installation and objects arranged on the ground.

What is claimed is:

1. A method for detecting objects on an installation, comprising:
    providing a three-dimensional representation of the installation, wherein position and orientation of the representation and the installation are known, and
    acquiring a first image and a second image of the installation, wherein the two images are recorded from different positions above the installation,
    wherein for a plurality of sections of the installation, a comparison of the first and second images in each case is carried out making use of a parallax effect,
    wherein in the case of a match between the images in a region surrounding the installation, an object is detected on the installation,
    wherein the installation comprise one or more of an overhead line and a pipeline,
    wherein the provided three-dimensional representation of the installation is used to restrict a search space for the installation or to assign the recognized object to a component of the installation in the three-dimensional representation, and
    wherein the three-dimensional representation is captured as a three-dimensional point cloud (PCD), with the three-dimensional point cloud (PCD) being semantically segmented in order to restrict a search space for the installation in the three-dimensional point cloud (PCD).

2. The method as claimed in claim 1,
wherein for the overhead line, the semantic segmentation is carried out by applying a model of a catenary curve for detecting conductor cables of the overhead line.

3. The method as claimed in claim 1,
wherein the three-dimensional representation is obtained by a "light detection and ranging (LIDAR)" sensor and acquired as a three-dimensional point cloud (PCD).

4. The method as claimed in claim 1,
wherein the images are recorded by a camera for visible light.

5. The method as claimed in claim 1,
wherein the camera is guided along the installation with an aircraft in order to record the first and second images at the two different positions.

6. The method as claimed in claim 1,
wherein the three-dimensional representation of the installation is projected into each of the two images in order to define the sections in each case.

7. The method as claimed in claim 1, wherein the position and orientation of the representation are determined by a position determination system.

8. An assembly for detecting objects on an installation, comprising:
an aircraft with a "light detection and ranging (LIDAR)" sensor for acquiring a three-dimensional representation of the installation, and
a position detection device for acquiring position and orientation of the three-dimensional representation of the installation, and
a camera for visible light, designed to acquire a first image and a second image of the installation, wherein the two images are recorded from different positions above the installation,
wherein an evaluation device is designed to perform a comparison of the first and second images for each of a plurality of sections of the installation by exploiting a parallax effect,
wherein in the case of a match between the images in a region surrounding the installation an object is detected on the installation,
wherein the installation comprises one or more of an overhead line and a pipeline,
wherein the provided three-dimensional representation of the installation is used to restrict a search space for the installation or to assign the recognized object to a component of the installation in the three-dimensional representation, and
wherein the three-dimensional representation is captured as a three-dimensional point cloud (PCD), with the three-dimensional point cloud (PCD) being semantically segmented in order to restrict a search space for the installation in the three-dimensional point cloud (PCD).

9. The assembly as claimed in claim 8,
wherein for the overhead line, the evaluation device is designed to perform the semantic segmentation by applying a model of a catenary curve for detecting conductor cables of the overhead line.

10. The assembly as claimed in claim 8,
wherein the evaluation device is designed to project the three-dimensional representation of the installation into each of the two images in order to define the sections in each case.

11. The assembly as claimed in claim 8,
wherein the aircraft is an airplane, a helicopter, or a drone.

12. The assembly as claimed in claim 8,
wherein the evaluation device is provided in the aircraft.

13. The assembly as claimed in claim 8,
wherein the evaluation device is provided as a central server.

* * * * *